(12) United States Patent
Iwasaki (10) Patent No.: US 7,257,282 B2
(45) Date of Patent: Aug. 14, 2007

(54) PROCESS OF INFORMATION TRANSMISSION IN OPTICAL CIRCUIT DEVICE AND OPTICAL CIRCUIT DEVICE THEREFOR

(75) Inventor: Tatsuya Iwasaki, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 199 days.

(21) Appl. No.: 10/533,564

(22) PCT Filed: Dec. 25, 2003

(86) PCT No.: PCT/JP03/16706

§ 371 (c)(1),
(2), (4) Date: May 3, 2005

(87) PCT Pub. No.: WO2004/062138

PCT Pub. Date: Jul. 22, 2004

(65) Prior Publication Data

US 2006/0110093 A1    May 25, 2006

(30) Foreign Application Priority Data

Jan. 6, 2003    (JP) ............................. 2003-000017

(51) Int. Cl.
*G02B 6/12*    (2006.01)

(52) U.S. Cl. ............................ 385/14; 385/15; 385/92; 398/135

(58) Field of Classification Search .................. 385/14, 385/15, 92; 398/135
See application file for complete search history.

(56) References Cited

U.S. PATENT DOCUMENTS 5,191,219 A    3/1993    Linke .......................... 250/551
5,357,122 A    10/1994    Okubora et al. .............. 257/84

(Continued)

FOREIGN PATENT DOCUMENTS

| JP | 5-183515 | 7/1993 |
| JP | 8-181654 | 7/1996 |
| JP | 9-107330 | 4/1997 |

(Continued)

OTHER PUBLICATIONS

Hideo Itoh, et al., "Multidimensional Optical Interconnections Using Beam-Scanning Laser Diodes", Electronics and Communications in Japan, Part I1: Electronics, Scripta Technica, New York, U.S., Voh 75, No. 11, (Nov. 1, 1992), pp. 32-41, XP000381545, ISSN: 8756-663X.*

*Primary Examiner*—Frank G. Font
*Assistant Examiner*—Michael P. Mooney
(74) *Attorney, Agent, or Firm*—Fitzpatrick, Cella Harper & Scinto.

(57) ABSTRACT

An information transmission process is disclosed in which information is transmitted between a signal-emitting port for emitting an optical signal and plural signal-receiving ports through a light transmissive medium in an optical circuit device. The process comprises a first step of transmitting a first information from the signal-emitting port by emitting light in a first emission angle range to transmit first information to at least one of the signal-receiving ports, and a second step, after the first step, of transmitting second information from the signal-emitting port by emitting light in a second emission angle range different from the first emission angle range to transmit second information to at least one of the signal-receiving ports.

5 Claims, 8 Drawing Sheets

U.S. PATENT DOCUMENTS

| | | | |
|---|---|---|---|
| 6,278,231 B1 | 8/2001 | Iwasaki et al. | 313/310 |
| 6,573,984 B2 * | 6/2003 | Jung et al. | 356/73 |
| 6,838,297 B2 | 1/2005 | Iwasaki et al. | 438/20 |
| 2005/0129348 A1 | 6/2005 | Iwasaki | 385/14 |

FOREIGN PATENT DOCUMENTS

| | | |
|---|---|---|
| JP | 9-307502 | 11/1997 |
| JP | 2000-261383 | 9/2000 |
| WO | 2004/093354 | 10/2004 |

* cited by examiner

PROCESS OF INFORMATION TRANSMISSION IN OPTICAL CIRCUIT DEVICE AND OPTICAL CIRCUIT DEVICE THEREFOR

TECHNICAL FIELD

The present invention relates to a process for information transmission by light through a light-transmissive medium between a signal-emitting port having a function of emitting optical signals and a signal-receiving port having a function of receiving optical signals, and relates also to an optical circuit device therefor.

BACKGROUND ART

In recent years, information treating apparatuses such as personal computers, portable telephones and personal digital assistances (PDA) are requested not only to be quick in data processing, small in size, light in weight but also to be suitable for switching among plural applications. On the other hand, control apparatuses such as robots are requested to be controllable by switching plural control algorithms in real time. From such a viewpoint, circuit substrates are demanded in which the circuit is reconfigurable, especially those in which the circuit is reconfigurable at a high speed in real time.

Conventionally, efforts are made to develop such a circuit by improvement of electronic circuits, switches, memories, and the like. However, with the increase of the processing speed, problems arise such as wiring delay, and EMI (electro-magnetic interference). In one method for avoiding such disadvantages, optical wiring is used which has advantages of high-speed transmission and no electromagnetic induction inherently.

U.S. Pat. No. 5,357,122, for instance, discloses an optical-electronic integrated circuit device capable of three-dimensionally transmitting optical signals between plural semiconductor substrates on each of which an integrated circuit is previously formed.

U.S. Pat. No. 5,191,219 discloses an information processing apparatus, which comprises means forming a planar optical waveguide which extends in two dimensions and serves as a shared medium, a plurality of light-emitting means and a plurality of light-detecting means extending in a two dimensional arrangement over said planar optical waveguide for broadcasting light signals and abstracting light signals, respectively, into and from said planar optical waveguide, and a plurality of subsystems including input and output ports for processing the light signals in the shared medium, the light-detecting means being couples to input ports and the light-detecting means being coupled to output ports of the subsystems.

However, the optical wirings employed in the above cited references and other prior art techniques are not sufficient in the flexibility in optical wiring formation.

DISCLOSURE OF THE INVENTION

The present invention intends to provide an information transmission process for transmitting prescribed information by forming optical circuit flexibly, and to provide also an optical circuit device therefor.

The information transmission process of the present invention transmits information between a signal-emitting port for emitting an optical signal and plural signal-receiving ports for receiving the optical signal through a light transmissive medium in an optical circuit device, the process comprising a first step of transmitting a first information from the signal-emitting port by emitting light in a first emission angle range to transmit first information to at least one of the signal-receiving ports, and a second step, after the first step, of transmitting second information from the signal-emitting port by emitting light in a second emission angle range different from the first emission angle range to transmit second information to at least one of the signal-receiving ports.

The optical circuit device of the present invention comprises plural ports having at least one of an optical signal-emitting function and an optical signal-receiving function, the optical circuit device having a constitution in which optical information can be transmitted between the port through a light-transmissive medium and at least one of the ports is capable of emitting light in one of two or more emission angle ranges selectively.

Thus the present invention provides an information transmission process for transmitting prescribed information by forming optical circuit flexibly, and provides also an optical circuit device therefor.

BEST MODE FOR CARRYING OUT THE INVENTION

The process of information transmission of the present invention is constituted as described above.

The process of information transmission of the present invention comprises steps of emitting light from a signal-emitting port in different emission angle ranges, being capable of transmitting prescribed information by transmitting optical signals between the signal-emitting port and the signal-receiving port by forming the optical circuit with flexible interconnection. The content of the information to be optically transmitted in the above-mentioned steps is decided suitably depending on the information-transmission protocol, the purpose of the information transmission, and so forth. In the respective steps, the receivable signal-receiving ports are decided by the light emission angle range of the light from the signal emission port. However, not all of the receivable signal-receiving ports need be employed for the signal reception. The reception or no-reception may be decided by the signal-receiving port side.

The information transmission process of the present invention includes an embodiment in which, in the first step, a communication path or paths are established between the signal-emitting port and at least one signal-receiving port, and in the second step, data is transmitted through the established communication path, the light emission angle range of the light emitted from the signal-emitting port in the first step being larger than the light emission angle range of the light emitted from the signal emitting port in the second step. Further, the information transmission process of the present invention includes another embodiment in which the data transmission speed in the first step is controlled to be lower than the data transmission speed in the second step.

Further, the information transmission process of the present invention includes still another embodiment in which information is surely transmitted by light through steps of
(1) emission of a communication-requesting signal from port A in a first emission angle range,
(2) emission of a standby signal from port B having received the communication-requesting signal back to port A, and
(3) transmission of data from port A to port B in a second emission angle range smaller than the first emission angle range.

Further, the information transmission process of the present invention includes still another embodiment in which the response signal is transmitted through an electric wiring, and the number of the ports receiving the information in the first step is more than the number of the ports receiving the information in the second step.

The optical circuit device has a constitution described before.

The optical circuit device of the present invention may be constituted from a circuit substrate having mixedly an optical circuit and an electronic circuit, or may be constituted from a circuit substrate having an electronic wiring layer and an optical wiring layer of two-dimensional optical waveguide.

The present invention is described below by reference to examples without limiting the invention in any way.

EXAMPLE 1

Figure 1:
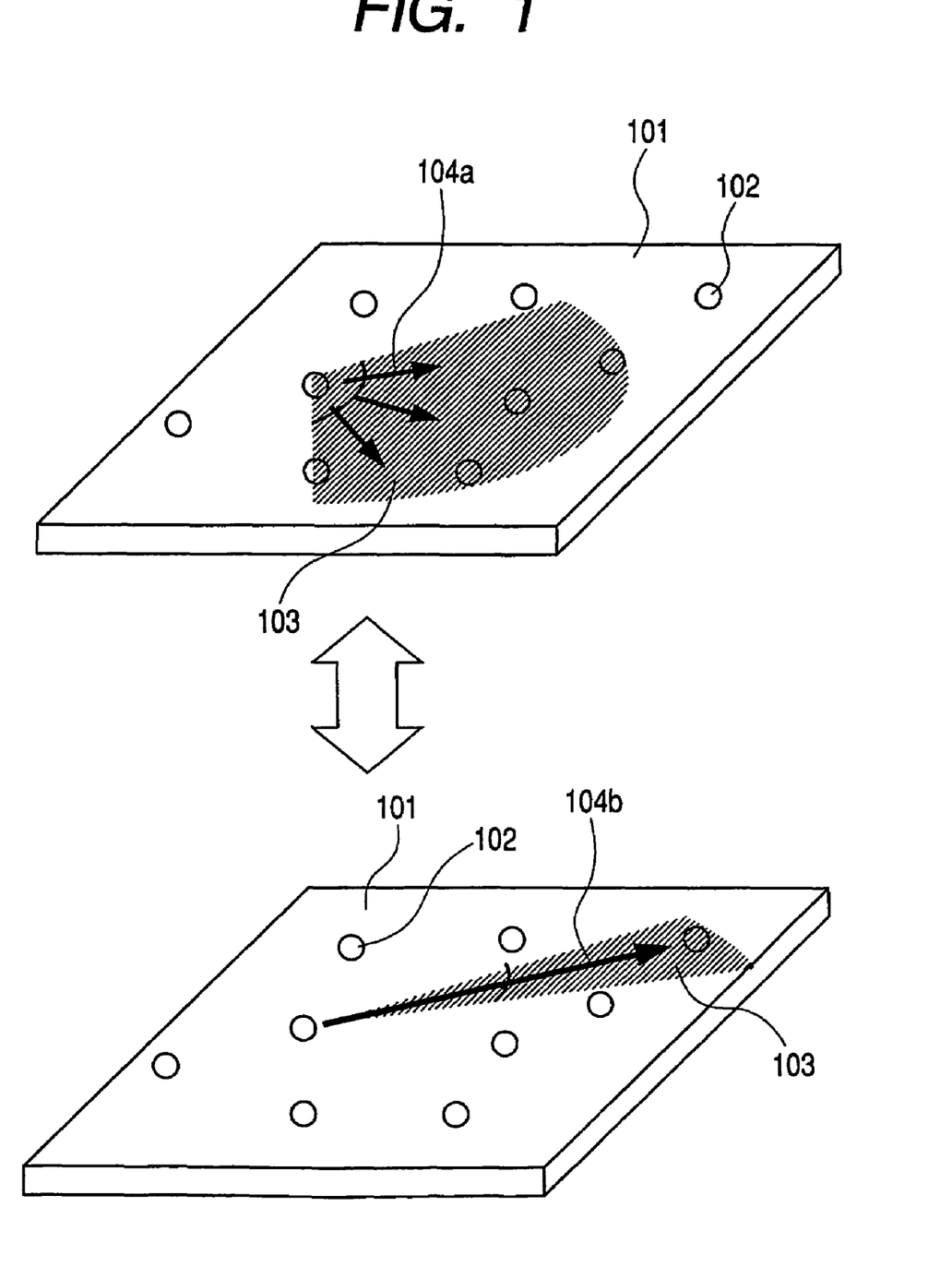
FIG. 1 shows emitting angles of a 2D-optical waveguide.

The circuit substrate in this Example has an optical circuit and an electronic circuit mixedly, and is constituted to be capable of transmitting information optically between ports having a function of emitting or receiving an optical signal. The light-emitting part of the signal-emitting port for information signal emission has a means for propagating light through a two-dimensional (2D) optical waveguide in an emission angle range selected from two or more emission angle ranges. The switching means enables optical information transmission between the ports. FIG. 1 shows an example of different emission angle ranges 104a,104b in propagation of light 103 from a certain port 102 through 2D optical waveguide 101 in this Example. The emission angle range signifies an emission angle φa in an x-y plane in the case where the light transmission medium is 2D optical waveguide 101 as shown in FIG. 1. In the z-direction perpendicular to this plane, the light may be allowed to propagate in all possible angles (in an all-waveguide mode), or may be propagated at a selected angle (in a single propagation mode), but is not specially limited thereto. In this specification, the "emission angle range" in the 2D-waveguide signifies an emission angle in the x-y plane, unless otherwise mentioned. In the case where the light transmission medium is a three-dimensional optical guide or a free space, the "emission angle range" signifies a range of a solid angle of light emitted from the signal-emitting port.

Figure 2:
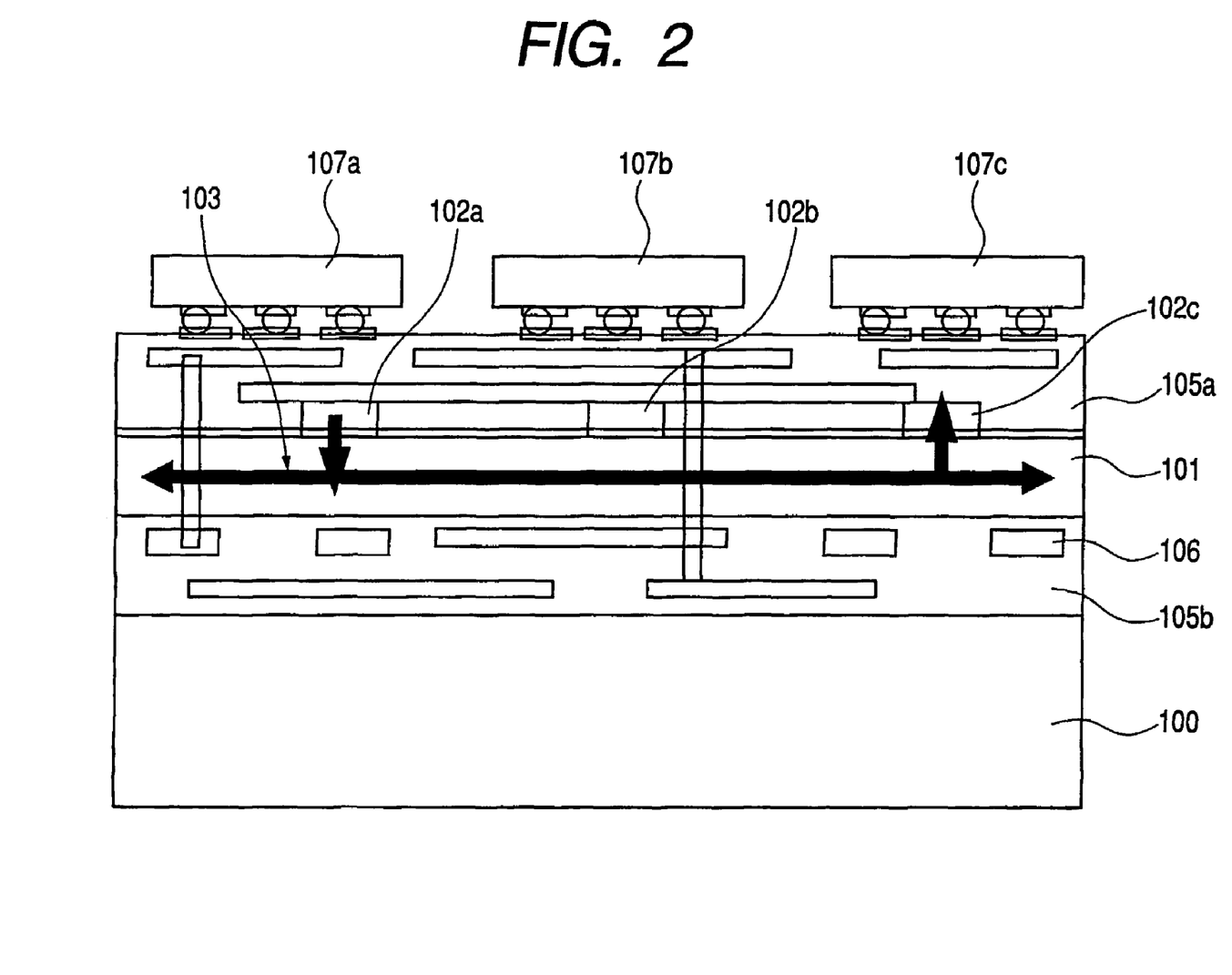
FIG. 2 shows a circuit substrate having an electronic circuit and an optical circuit in lamination.

FIG. 2 is a schematic sectional view for explaining the circuit substrate of Example 1. In FIG. 2, the numerals denotes the followings: 100, a base plate for the entire circuit; 101, a light transmission sheet as the 2D-light waveguide; 102, a light-input (signal-receiving) port or an output (signal emitting) port provided near the interface between light transmission sheet 101 and electric wiring layer 105; 103, propagating light in the light transmission sheet (optical wiring layer) 101; 105, an electric wiring layer holding the light transmission sheet 101 therebetween; 106, an electric wiring in electric wiring layer 105; 107, an electronic device like LSI provided on electric wiring layer 105.

Figure 3:
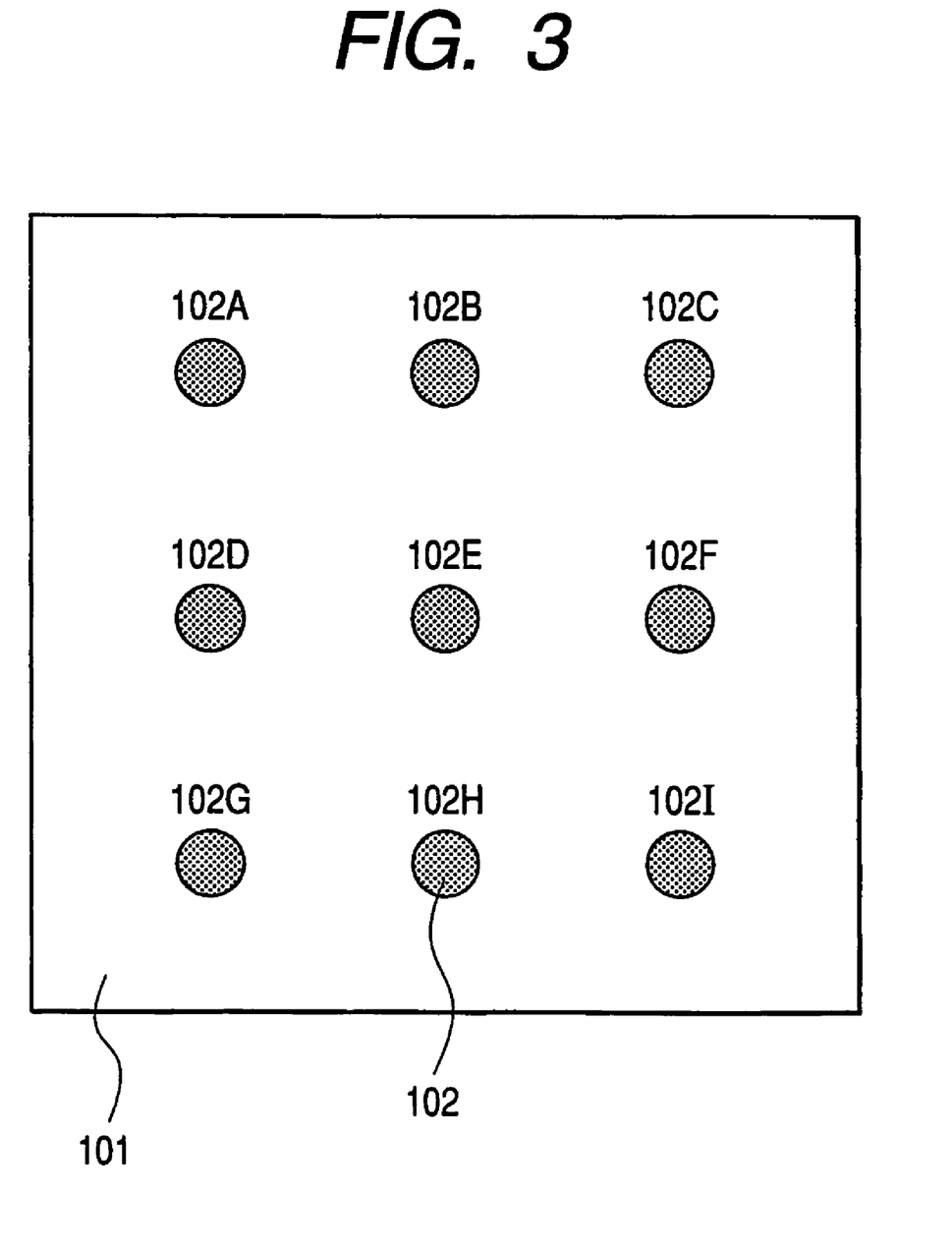
FIG. 3 shows an example of arrangement of ports.

In the constitution example of FIG. 2, optical wiring layer 161 is held between a pair of electric wiring layers 105, and optical ports 102 are provided near the interface between electric wiring layer 105a and optical wiring layer 101. In this constitution, ports 102 are placed in contact with the upside of light emission sheet 101, but the placement is not limited thereto: the port may be buried in light transmission sheet 101 to couple the light directly with the waveguide, or may be placed at the end face of light transmission sheet 101. In FIG. 2, the circuit has three ports 102, namely an emission port (102a) and a receiving port (102c). This shows merely an example. The port 102 may be placed in an arrangement as shown in FIG. 1 viewed from above light transmission sheet (optical wiring layer) 101. Otherwise, the ports may be arranged in a grid pattern as shown in FIG. 3. In other words, any number of ports may be placed in any positions in the plane. The size of light transmission sheet 101, for instance, ranges from about 100 micrometers to tens of centimeters, depending on the information transmission speed between arbitrary positions in 2D. In this Example, the substrate has a size of 3 cm square.

The circuit substrate in this Example, as shown in FIG. 2, has electronic devices 107, electronic circuits having electric wiring 106 for connecting them, and optical circuits utilizing a light transmission sheet 101 as a transmission medium in coexistence. In such a constitution, the signal from electronic device 107 is converted to an optical signal by port 102a, the optical signal is transmitted through light transmission sheet 101, and converted by another port 102c into an electric signal.

The constituting elements are explained below in more detail.

Light transmission sheet 101 in this Example is a polycarbonate sheet of 100 μm thick (refractive index: 1.59) coated with a fluorinated polyimide (refractive index: ca. 1.52) as a clad. On the light transmission sheet 101, a print substrate having electronic device 107 thereon is laminated and adhered to prepare a high-density circuit substrate laminated as shown in FIG. 2. Light transmission sheet 101 is a light transmissive medium serving as a two-dimensionally spread optical waveguide. Thereon, an optical device may be placed at any position, and optical data can be transmitted from port 102 at any position to any other port 102. Naturally, light transmission sheet 101 is not limited to the above-mentioned one: any material is useful therefor such as glass, semiconductors, and organic materials provided that the material is sufficiently transmissive to the propagating light. For instance, commercial glass substrates, monocrystalline substrates of lithium niobate and the like, semiconductor substrates of Si, GaAs, and the like, and organic sheets like polycarbonates, acrylic resins, polyimides, polyethylene terephthalates, and the like are useful as they are. Otherwise, the sheet can be formed by film formation by vacuum vapor deposition, dipping, coating, or a like method, or molding by injection molding, extrusion molding, or a like method. The thickness of light transmission sheet 101 may be in the range from 1 micrometer to several centimeters, preferably from 50 micrometers to several millimeters (100 micrometers in the above example) in view of ease of optical axis registration.

Light transmission sheet 101 may be placed on any substrate 100. The material useful as substrate 100 includes printed boards; metal boards of aluminum, stainless steel, or the like; semiconductor boards of Si, GaAs, or the like; insulating boards of glass, or the like; resin boards or sheets of PMMA, polyimides, polycarbonates, or the like.

Electric signals of electronic device 107 such as LSI can be transmitted as optical signals through ports 102 and light transmission sheet 101, or can be transmitted as electric signals without conversion through electric wiring 106 to neighboring electronic device 107. The signal transmission process may be selected as necessary. Electronic device 107 includes electric parts such as resistances and condensers, and IC or LSI chips such as CPU, RAM, and RF oscillators. Electric wiring 106 is formed from a metal such as aluminum and copper by a process of vacuum vapor deposition, screen printing of an electroconductive paste, or a like method. Otherwise, the electroconductive circuit pattern may be formed by laminating a metal foil such as electrolytic copper foil, and etching the foil chemically by use of an etching resist of a prescribed pattern.

Port 102 has functions of emitting and/or receiving optical signals. That is, the port has a light outputting part for converting electric signals to optical signals, or light receiving part for converting optical signals into electric signals, or the both thereof. Preferably the port has both of the above functions in view of the functionality. The light emitted from light-emitting element, i.e., light outputting part of port 102 for signal emission, propagates through optical transmission sheet 101 and inputted to a light-receiving element which is a light receiving part of port 102 for signal reception. In port 102 for receiving the signal, the signal is converted into an electric signal. Thereby signal is transmitted from port to port to form an optical circuit. Thus, an optical circuit is constructed.

The light-outputting part of port 102 has a light-emitting element, a means for emitting light in two or more emitting angles to propagate the light in 2D optical guide 101, and a means for switching the emission angle. Thereby, as shown in FIG. 1, the light can be propagated at different emission angles from port 102 in 2D optical waveguide 101, and the emission angle can be switched. The light-emitting element applicable to the light-emitting part includes laser diodes, surface emitting laser, LEDs, and the like. Of these, VCSEL (vertical cavity surface emitting laser) is preferred since it enables propagation at a small emission angle $\phi a$ or over an emission angle range.

The logic signal of electronic device 107 like LSI (e.g., CMOS: 3.3 V) can give a sufficient voltage for driving the light-emitting element of port 102. The electric signal can be converted into an optical signal by application of a logic signal as a forward bias to the light emitting element in port 102. In the case where the light-emitting element is a VCSEL (wavelength: 0.85 μm), the characteristic properties of an individual VCSEL are, for instance, a driving current of 3.0 mA, and optical output of 3 mW.

Figure 4A:
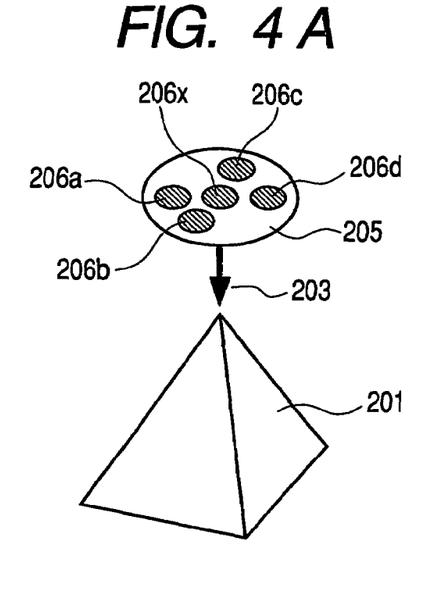
FIGS. 4A, 4B and 4C show constitutions of an optical coupling portion.
Figure 4B:
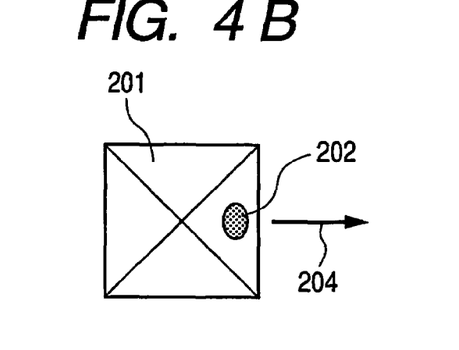
Figure 4C:
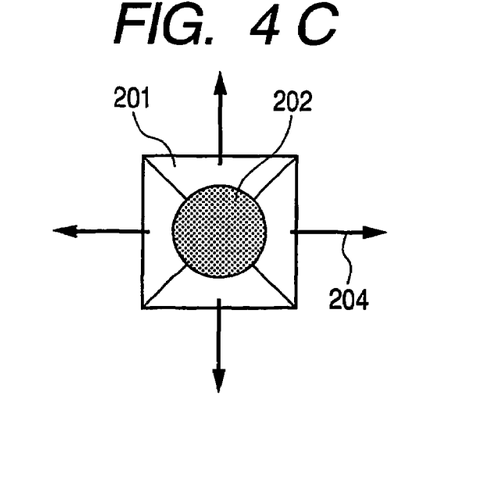

The light emitted from the light-emitting element is allowed to propagate at a prescribed emission angle $\phi a$ through light transmission sheet 101. Port 102 in this Example can be constituted to be capable of propagating the light in four emission angles $\phi a$ of 90°, 180°, 270°, and 360°. FIGS. 4A to 4C shows an example of the constitution for the emission angles. This constitution employs a quadrangular pyramid type of mirror shown in FIG. 4A as optical coupler 201 provided in light transmission sheet 101. Above quadrangular pyramid mirror 201, are placed, for instance, five light-emitting elements 206a,206b,206c,206d,206x: one at the center, and the others for the respective slant faces, to project the light from the devices onto the respective slant faces. Light 203 from light-emitting element 206 of light outputting part 205 is projected from above the pyramid mirror 201 and reflected toward the lateral sides to be coupled with light transmission sheet 101. When the light from light-emitting element 206 is projected to light-illumination position 202 on one slant face of the pyramid, as shown in FIG. 4B, the reflected light 204 is allowed to propagate at an emission angle of about 90°. When the light is projected to light-illumination positions 202 on four slant faces of the pyramid, as shown in FIG. 4C, the reflected light 204 is allowed to propagate at an emission angle of about 360°. When the light is projected onto two, or three slant faces, the emission angles are respectively 180°, and 270°. When the light is projected onto the center light-emitting element 206x, the light is allowed to propagate in all directions of 360°. In this Example, since the slant face of the pyramid is a diffusion plane, the propagating light is uniform in intensity over the entire range of the emission angles.

In this Example, as described above, the emission angle can be switched by providing plural light-emitting elements in port 102 and driving the light-emitting elements selected electrically. Such a switching means is a preferred example enabling the emission angle change with high reliability. In another example, plural light-emitting elements are arranged in an array, and different emission angles $\phi a$ or emitting directions are separately set. In such an example also, the emission angle $\phi a$ or the emission direction can be set by electrically selecting the driving emission element in the array selectively.

In still another example of the device, the emission angle is controlled or changed by controlling the injected electric current or other factor of light-emitting elements in the light-outputting part. In another method, the emission angle can be made changeable by making variable the coupling state of the light-emitting element of the light-outputting part with the 2D optical waveguide. More specifically, the emission angle can be changed by moving an optical coupler member such as mirrors, prisms, lenses, and gratings placed close to the light-emitting elements, or by changing the position of the light-emitting element itself. Otherwise, similar effects can be achieved by modulating the optical properties such as the refractive index of the material constituting the optical coupler. For instance, in one method, fine movable mirror is constituted which applies electrostatic force, magnetic force, a piezo element, or the like by micromechanics technique. The optical coupler employed preferably in the light-outputting part includes lenses, prisms, mirrors, gratings since they are capable of emitting the light from the light-emitting element at a prescribed emission angle into a 2D waveguide. In particular, typical members for emitting light from the light-emitting element into 2D waveguide include mirrors of a cone shape, a pyramid shape, and a sphere shape. Naturally the means for changing the emission angle range is not limited thereto, but any means may be used.

The optical signal propagating through light transmission sheet 101 is caught by light-receiving element in port 102, and is converted to an electric signal. The light-receiving element applicable to the light-inputting part includes PIN photodiodes, and MSM photodiodes. In this Example, Si PIN photodiode or the like is useful. This PD (photodiode)

is connected to the electronic circuit. The electric signal obtained by conversion is introduced into a neighboring electronic device 107 like LSI as an electric input signal, and is processed. In the processing, if a preamplifier is integrated with the light-receiving element, for amplifying the electric signal, the CMOS-compatible voltage can be restored. The light-receiving part of port 102 is made capable of receiving light from all directions of 360° in the 2D optical waveguide by employing an optical coupler such as mirrors in a cone shape or sphere shape (e.g., provided just below the light-receiving element in light transmission sheet 101). In such a manner, the light-inputting parts are uniformized and simplified entirely in constitution. Naturally, the light-inputting part may be constituted to receive light only from a prescribed direction in the 2D optical waveguide.

A light-receiving port may contain plural light-receiving parts arranged in an array. In particular, the light receiving parts may be arranged respectively to receive light from different direction. The receiving light direction can be differentiated and selected by selecting the light-receiving part in the array.

As the results of driving the electronic device and the optical device of the present invention, it was confirmed that an optical interconnect was formed between the ports and the prescribed function could be conducted. More specifically, the optical circuit worked effectively which has a means for changing the emission angle range and the emission direction suitably depending on the communication contents. Such a circuit substrate has high freedom in wiring not only in the electronic circuit but also in optical wiring circuit with flexible interconnection. With such a constitution, by conducting the communication system described below, high-speed communication can be realized over a relatively long distance.

A process for information transmission employing the above constitution is explained below.

Figure 6:
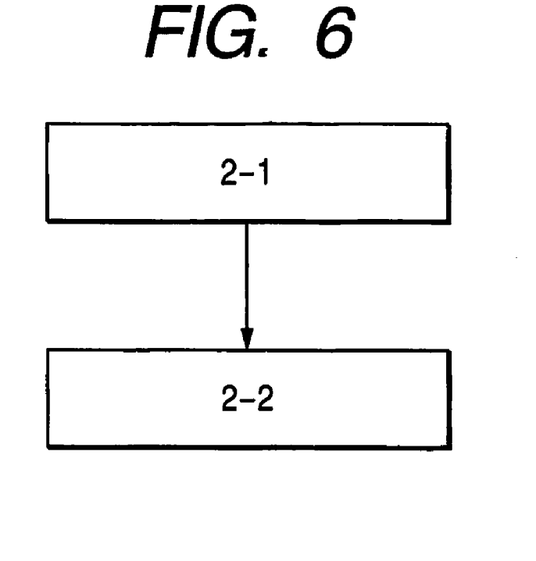
FIG. 6 is a flow chart of the communication system of Example 1 of the present invention.

The process of information transmission by light between ports in this example comprises a step of establishing a communication path, and a step of transmitting data through the communication path to transmit intended information. Since 2D optical waveguide 101 is used by plural ports 102 in common, the reliability in information transmission can be increased by establishing the communication paths. This communication system is characterized by changing the light-emission angle $\phi a$ or light-emission direction in the light transmission in establishing the communication path and transmitting the data. As shown in the flow chart of FIG. 6, this process comprises a step (2-1) of establishing a communication path by emitting light from a port 102 at a larger emission angle as a first emission angle, and subsequent step (2-2) of data transmission by light propagation at a smaller emission angle as a second emission angle. In such a communication process, in which light is allowed to propagate in a large emission angle range in establishing the communication path, the communication is feasible between ports 102 in a broader region, and information can be transmitted to an intended port selected form many ports. Moreover, the data transmission is conducted by light propagation in a smaller emission angle range, whereby the communication can be conducted with a sufficient light intensity for data transmission at a high speed and high reliability.

This effect is explained below in more detail. In the information transmission through a 2D optical waveguide, the intensity of the light propagating at an emission angle $\phi a$ decreases toward the light-receiving position in proportion to $L/(R\phi a)$ (L: size of light-receiving part; R: distance). In light propagation in a large emission angle, the light is effective only in the direction of signal reception, light in other directions being wasted. At a lower intensity of received signal, the error ratio is higher and the data transmission speed is limited owing to S/N. Therefore, for high-speed and reliable transmission, the emission angle is preferably smaller. On the other hand, in a smaller emission angle, the number of communication partners will be smaller, and the freedom degree of the circuit will be low. Such contradiction can be overcome effectively by the communication system which is capable of varying the aforementioned emission angle. Specifically, in establishing the communication path, signal is allowed to propagate preferably in a larger emission angle $\phi a$ at a lower communication speed, and after establishment of the communication path, data is transmitted preferably within a smaller emission angle at a higher communication speed. Generally, the quantity of data for establishing a communication path is small, and the speed of the path establishment is determined by physical circuit switching time rather than by data transmission speed. Therefore, the data transmission speed in the communication path establishment need not be so high practically. Further, in the communication path establishment, the lower data transmission speed enables the higher reliability in information transmission even with a smaller quantity of light reaching the receiving port, thus enabling information transmission to wider area. On the other hand, the quantity of the data to be transmitted is large, so that a higher speed is desirable for the data transmission. For this reason, the aforementioned selection of the data transmission speed in this communication system can be a preferred technique.

In such a manner, the above circuit and optical circuit device realizes an information transmission process which is capable of transmitting data through a common light-transmissive medium at a high speed and with high reliability. This process achieves an effect of lower power consumption by selecting suitably the emission angle range or emission direction.

Figure 5:
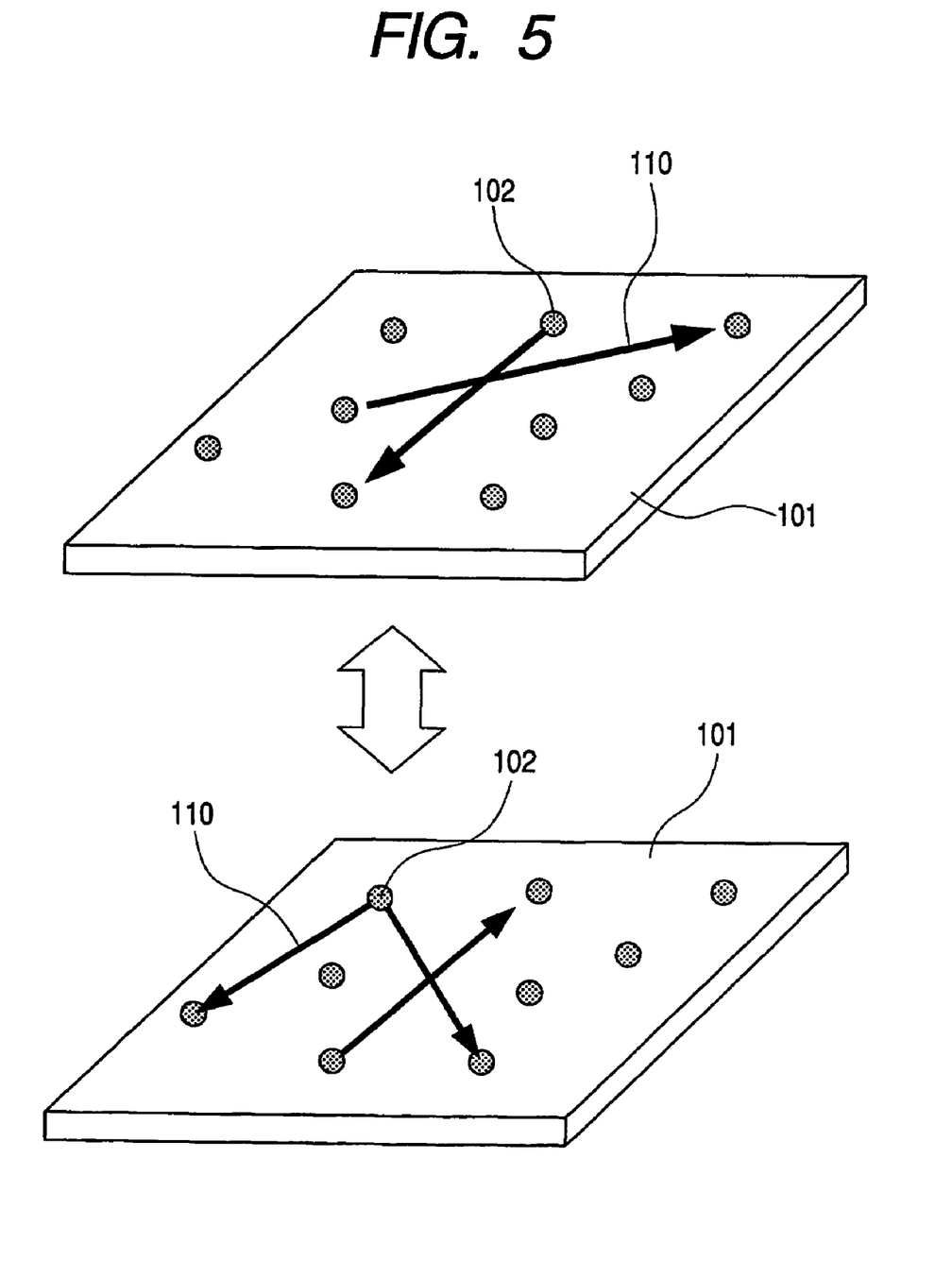
FIG. 5 shows reconstruction of an optical circuit.

The range of the emission angle $\phi a$ to be established is not limited. For instance, two emission angles may be employed: e.g., 360° all-direction broadcasting, and a minimum emission angle corresponding to one light-emitting element. The emission angle is preferably made variable continuously, but may be variable discontinuously. In emission in a small emission angle, the emission direction is preferably changeable. In other words, port 102 has preferably both a means for switching the diffusion and the beam emission and a means for setting the beam direction. Such a communication method not only enables switching of one-to-one port combinations but also enables switching of the transmission paths to one-to-plural port combinations as shown in FIG. 5, namely reconstruction of the optical circuit.

Generally, the intensity of the received light varies depending on the propagation distance from the position of the optical device on light transmission sheet 101, which decreases the reliability of signal transmission. However, the above communication process is effective regardless of the position of the optical device. The aforementioned circuit substrate in which an electronic circuit and an optical circuit are coexisting, and the communication process suitable therefor enable reconstruction of a flexible circuit which is less affected by electromagnetic emission noise and has high freedom in design, and also enable processing a large quantity of information at a high speed.

The use of a 2D waveguide, namely a light transmission sheet, for the optical circuit realizes the above communication process, and enables mounting of an optical device (light-emitting element or light-receiving element) on a desired position, and information transmission between arbitrary positions. The circuit substrate has effects of ease of optical positioning for optical coupling between an optical device and a waveguide layer. Further, owing to the simple constitution, the circuit substrate can readily be formed in a thin shape with a high density of the circuit.

EXAMPLE 2

In Example 2, the circuit substrate described in Example 1 and another communication process is employed. In FIG. 2, data transmission from LSI 107*a* to LSI 107*b* on a substrate is considered. The two LSIs 107 are assumed to be two CPUs, or one CPU and one RAM.

Firstly, LSI 107*a* designates signal-emitting port 102, for instance port E in FIG. 3. Usually, the nearest port (102*a* in FIG. 2) is designated, but is not limited to one port. The combination of one electronic device 107 with port 102 is not preliminarily fixed, but port 102 is designated every time when optical wiring connection becomes-necessary. Therefore, the number of ports 102 prepared may be much less than the number of optical wiring devices 107.

Figure 7:
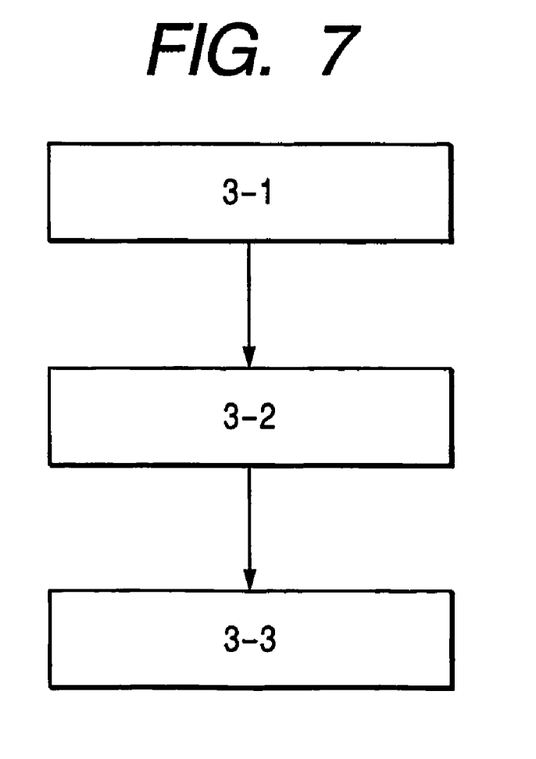
FIG. 7 is a flow chart of the communication system of Example 2 of the present invention.

FIG. 7 shows an example of a flow chart of an optical communication process between ports 102 in this Example.

(3-1) A communication-requesting signal is emitted from port E (signal-emitting port) in a first emission angle (wide-angle).
(3-2) Port H having received the communication-requesting signal returns a standby signal to port E.
(3-3) Signal-emitting port E transmits data in a second emitting angle (small angle) to port H.

Thus, the communication path is established between port E and port H in steps (3-1) and (3-2), and the data is transmitted in step (3-3).

The flow of the operation is explained below in more detail.

Firstly, in step (3-1), communication-requesting signal is emitted from port E (signal-emitting port) in an emitting angle of 360°. For this signal emission, light-emitting element 206*x* in FIGS. 4A to 4C are used for signal emission in all directions of 2D optical waveguide 101. The communication-requesting signal may include the address of port E, an information quantity to be transmitted, the address of LSI 107, and the like information. In this case, the quantity of the requested signal is 256 bytes and the signal transmission speed is 100 kbps.

In step (3-2), port H having received the communication-requesting signal returns a standby signal only when it can receive communication. The reception or no-reception depends on the state of communication with another port 102, a presence of empty memory nearby for storing a data to be received, and other factors. The standby signal includes the address of port H. The emission angle for the signal return is not limited insofar as port E can receive the returned signal, but a wider emission angle is preferred because of needlessness of establishment of the emission direction. In the case where port E and port H are connected by electric wiring, the return signal may be transmitted through the electric wiring. In this Example, the information is transmitted in an emission angle of 360°. The capacity of standby signal is 256 bytes, and the signal transmission speed is 100 kbps. The signal is returned from all of the port which can accept the signal in addition to port H.

In step (3-3), port E having received the standby signal transmits data in a second emission angle toward signal-receiving port H. In the case where port E has received the standby signal from plural ports 102, port E selects the most suitable port. For instance, one of the ports 102 is selected to be nearest to LSI 107*b* to which the information is finally transmitted. Otherwise, the port of the quickest response may be selected. A priority order of the port selection may be preliminarily decided. In this Example, the second emission angle in the data transmission is 90°. More specifically, in a light-outputting part as shown in FIGS. 4A to 4C, by operating one light-emitting spot (e.g., 206*c*) transmission is realized in a desired direction (toward port H in this Example) in the 2D optical waveguide 101. The communication speed in the data transmission is 50 Mbps. Since the second emission angle is smaller than the first emission angle, the signal can be treated at a high speed. In this Example, the information is transmitted to one port 102, but may be transmitted to plural ports simultaneously.

If signal-emitting port E receives no standby signal within a predetermined time, the communication-requesting signal is emitted again by re-start from step (3-1). The data received by port H from LSI 107*a* through port E by the above steps is transmitted through the electric wiring to LSI 107*b*.

By such a technique, the wiring between LSIs 107 can be switched as desired. In other words, the circuit can be reconstructed. For instance, the circuit for transmission of data from port E to port H can be switched successively to transmit data from port C to port D and port F, and so forth.

According to this Example, the circuit can be switched in a relatively short time, and data can be transmitted precisely. Further, in communication path establishment, the information is transmitted in a large emission angle range at a low communication speed, whereby the information can be transmitted over a large region. On the other hand, in transmission of an intended main data, the emission angle range is made smaller, whereby sufficient quantity of light can be transmitted to the signal receiving port at a high speed with high reliability. With such a technique, by selecting optimum emission angle range, the energy for the information communication is effectively used (effect of reduction of power consumption).

EXAMPLE 3

The circuit substrate of Example 3 has two light-emitting elements in port 102. For the one light-emitting element, a conical mirror is provided as an optical coupler for light propagation in 360° all directions, and for the other light-emitting element, a movable mirror is provided as an optical coupler. The emission angle by the mirror is 10°, and the light propagation direction in the 2D optical waveguide 101 can be set as desired by moving the mirror. The other constitution is similar to that in Example 1.

In this Example, information is transmitted with higher reliability by using a higher-grade communication system in comparison with Example 2. The communication process of this Example is explained by reference to the flow chart of FIG. 8.

(4-1) The port starting the signal-emission (e.g., port B in FIG. 3) judges the availability of the communication medium (i.e., availability of 2D optical wave guide 101). For this judgment, for instance, the medium is regarded as being available when the light intensity detected by the light-receiving element is lower than a prescribed level. If a higher light intensity than a certain threshold value is detected, the medium is regarded to be working, and the signal emission is stopped for a certain time for waiting until the medium becomes available. In such a manner, for instance, the light transmission medium is used exclusively, so that the reliability is improved.

Figure 8:
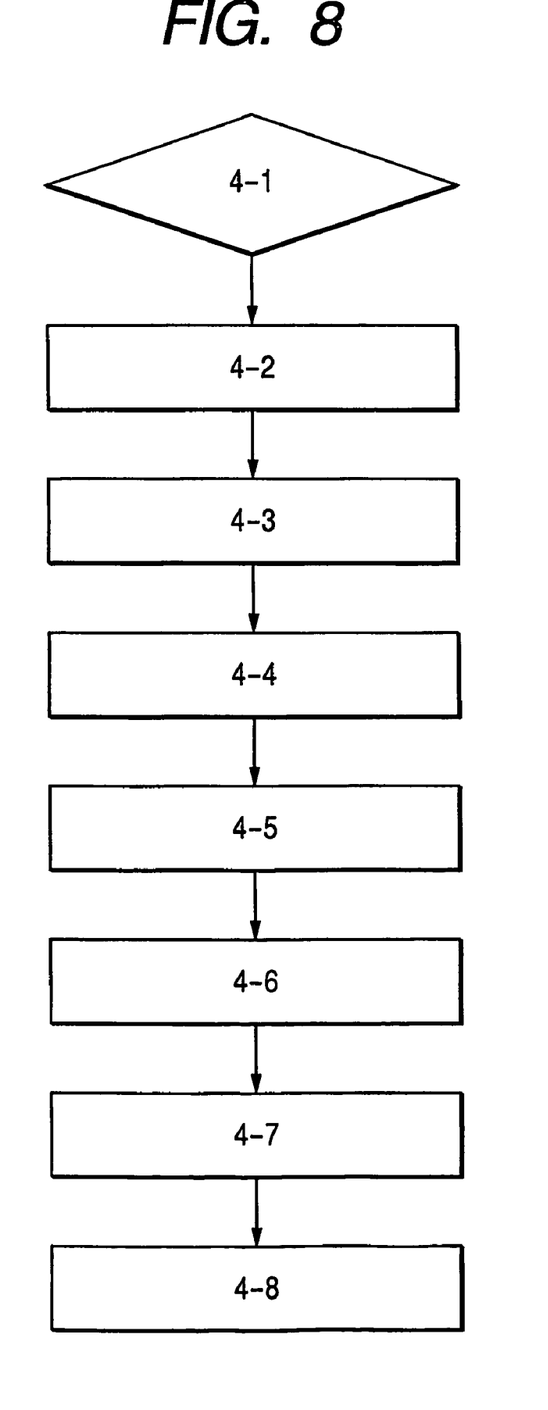
FIG. 8 is a flow chart of the communication system of Example 3 of the present invention.

(4-2) In the next step, a communication-requesting signal is emitted from port B (signal-emitting port) in a first emission angle (wide-angle). In this Example, a light-emitting element corresponding to the optical coupler of the conical mirror is driven to emit a signal in the first emission angle of 360°. The communication-requesting signal includes the address of port B, the quantity of information to be transmitted, the address of the information receiver LSI 107, and other information. The information capacity employed is 256 bytes and the signal transmission speed is 100 kbps.

(4-3) Among ports 102, the port having received the communication-requesting signal, a port or ports ready for information reception (e.g., ports C, G, and I in FIG. 3) return a standby signal to port B. This step is similar to step (3-2) of Example 2.

(4-4) Port B having received the standby signal selects the communication port, and emits a path-designating signal in the emitting angle of 360°. The path designation signal includes the address of port B, the selected communication port G, and other information. The emission angle for this signal return is not limited insofar as the signal reaches port G, but a wider emission angle is preferred because of needlessness of establishment of the emission direction. In the case where port B and port G are connected by electric wiring, the return signal may be transmitted alternatively through the electric wiring. In this Example, the information is transmitted in an emission angle of 360°. The capacity of standby signal is 256 bytes, and the signal transmitting speed is 100 kbps.

(4-5) Port G having received the path designation signal transmits a reply signal to port B with a Flag of path establishment. The reply is conducted by an optical signal with an emission angle of 360°, but the angle is not limited thereto.

(4-6) Port B having received the path establishment signal transmits data to port G in a second emission angle (smaller angle). In this Example, the light is allowed to propagate toward port G by moving the movable mirror as the optical coupler. The emission angle is about 10°. The data transmission speed is 300 Mbps. With the smaller emission angle, the data can be transmitted at a high speed with high reliability.

(4-7) Successively, port B transmits a completion signal to port G. The transmission process is not limited thereto. In this Example, the information is transmitted with light in emission angle of 10°.

(4-8) Finally, port G returns a reception-completion signal to port B. The reply signal is transmitted by an optical signal with an emission angle of 360°, but is not limited thereto.

If the reply or other communication is not obtained during the communication, the communication becomes error, and the signal transmission should be re-started from the first step. The receiving port can be designed to recognize, as correct signals, only the data received within a certain time after the back transmission of the standby signal for higher reliability of the circuit.

According to this Example, the circuit can be switched in a relatively short time, and by supplementing the steps (4-1), (4-4), (4-5), (4-7) and (4-8) to the steps of Example 2, the transmission is made more reliable. Further, in communication path establishment, the information is transmitted in a large emission angle range at a low communication speed, whereby the information can be transmitted over a large region. On the other hand, in transmission of inherently intended main data, the emission angle range is made smaller, whereby sufficient quantity of light can be transmitted to the signal receiving port at a high speed with high reliability. With such a technique of this Example, the emission angle can be smaller than that in Example 2 by employing a movable mirror for optical coupling, whereby the communication can be conducted at a higher speed with higher reliability. In other points, this Example is similar to the aforementioned Examples.

EXAMPLE 4

In Example 4, the circuit substrate is the same as that in Example 2 except that the respective ports have a memory of 12 kilobytes. In this Example, a higher-grade communication system is employed to achieve higher reliability in information transmission in comparison with Example 2. The communication process of this Example is explained by reference to the flow chart of FIG. 9.

(5-1) On starting the system, resting ports which are capable of receiving information (e.g., ports A, B, C, . . . in FIG. 3) emit a standby signal periodically. For instance, the standby signal with the address thereof and a flag of standby is allowed to be emitted every 50 ms in the emitting angle of 360°. For this purpose, the signal emission from the respective ports 102 is made different in timing preliminarily to prevent surely any crosstalk. The standby signal has a capacity of 128 bytes and a signal transmission speed of 100 kbps.

(5-2) The signal-emitting port (e.g., port E in FIG. 3) reads signals from the signal-receiving ports to obtain the information on the signal-receiving ports. For instance, the signal-emitting port accumulates information for 100 ms, and stores the standby signals in the memory.

Figure 9:
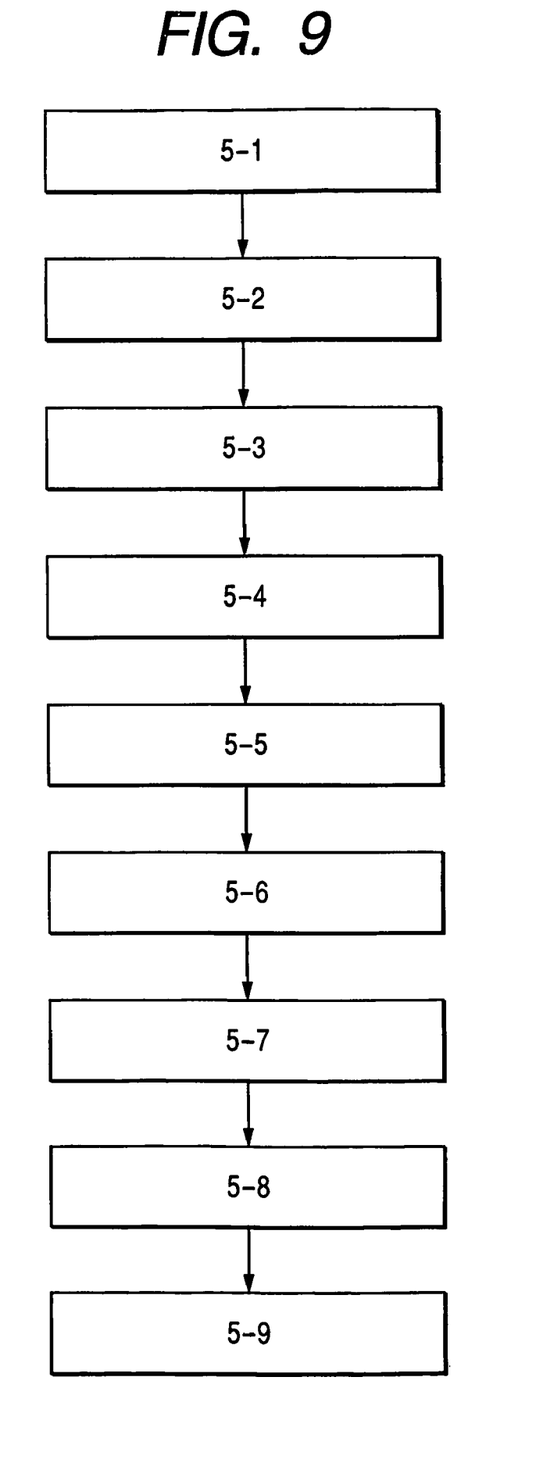
FIG. 9 is a flow chart of the communication system of Example 4 of the present invention.

(5-3) Signal-emitting port E selects a suitable port (e.g., ports B and H) from the standby ports, and emits a communication-requesting signal in the emission angle of 360°. The communication-requesting signal includes the address of signal-emitting port E, the quantity of information to be transmitted, the addresses of the signal-receiving ports B, H, a capacity of information to be transmitted; and other information. The information capacity of the communication-requesting signal is 256 bytes and the signal transmission speed is 100 kbps.

(5-4) Ports A, B, C, . . . having received the communication-requesting signal stop the emission of the standby signal. Thereby, the reliability of the data is improved in the subsequent data transmission.

(5-5) Among the port having received the communication-requesting signal, the port to receive the signal (ports B, H) transmits the standby signal to port E. This step is similar to the aforementioned step (3-2).

(5-6) Port E transmits data toward ports B and H respectively in a second emission angle (smaller angle), 90° in this Example. This step is similar to the aforementioned step (3-3).

(5-7) Subsequently, port E emits a transmission-completion signal in an emission angle of 360°.

(5-8) Ports B and H emit a reception-completion signal in an emission angle of 360°.

(5-9) Thereafter, all the ports 102 having received the transmission-completion signal and the reception-completion signal re-start the periodical emission of the standby signal. Thereby the communication path is released.

If the reply or other communication is not obtained during the communication steps, the communication becomes error, and the signal transmission should be re-started from the first step. In this Example also, the circuit can be switched in a relatively short time, and by supplementing the steps (5-1), (5-2), (5-4), (5-5), (5-7), (5-8), and (5-9) to the steps of Example 2, the transmission is made more reliable.

In this Example, the emission angle can be made smaller by the optical coupling by use of a movable mirror, which enables communication at a higher speed with higher reliability than in Example 2. The above processes and procedures are merely examples, and can be further improved in reliability by supplementing a procedure. However, the increase of the procedure increases the time for establishing the communication path correspondingly. Therefore, in view of the stability of the system, a suitable method is preferably designed. In other points, this Example is similar to the aforementioned Examples.

In the information transmission process of the above Examples, an optical circuit is formed flexibly between ports having functions of optical signal emission or reception. The information transmission process comprises a first step of establishing a communication path between the ports, and a subsequent second step of data transmission through the communication path to conduct intended information transmission. In the above process, the first emission angle range for emitting light from the port in the first step includes and larger than the second emission angle range for emitting light from the port in the second step. However, in another embodiment, the first emission angle range may overlap partly with the second-emission angle range. In still another embodiment, the second emission angle may include and larger than the first emission angle range. Such embodiments are suitable for instance in the case where, in the first step, an intended data is transmitted between ports, and subsequently in the second step, a signal containing suitable information is transmitted and the results are confirmed (for instance, communication of completion of the data transmission to ports not participating the transmission). The contents of the optical information transmission in the respective step are various depending on the communication protocol utilized, the objects of the transmission, and so forth. The emission angle in the respective steps is set depending on the contents of the optical transmission: for instance, data signal itself, control signal (e.g., communication-requesting signal, confirmation signal, address signal, interruption signal, etc.), and so forth.

The invention claimed is:

1. An information transmission process for transmitting information between a signal-emitting port for emitting an optical signal and plural signal-receiving ports for receiving the optical signal through a light transmissive medium in an optical circuit device, the process comprising:
   a first step of transmitting a first information by emitting light in a first emission angle range from the signal-emitting port to transmit first information to at least one of the signal-receiving ports; and
   a second step, after the first step, of transmitting second information from the signal-emitting port by emitting light in a second emission angle range different from the first emission angle range to transmit second information to at least one of the signal-receiving ports,
   wherein, in the first step, a communication path is established between the signal-emitting port and at least one signal-receiving port, and subsequently in the second step, data is transmitted through the communication path.

2. An information transmission process for transmitting information between a signal-emitting port for emitting an optical signal and plural signal-receiving ports for receiving the optical signal through a light transmissive medium in an optical circuit device, the process comprising:
   a first step of transmitting a first information by emitting light in a first emission angle range from the signal-emitting port to transmit first information to at least one of the signal-receiving ports; and
   a second step, after the first step, of transmitting second information from the signal-emitting port by emitting light in a second emission angle range different from the first emission angle range to transmit second information to at least one of the signal-receiving ports,
   wherein the first emission angle range for emitting the light from the signal-emitting port in the first step is larger than the second emission angle range for emitting the light from the signal emitting port in the second step.

3. An information transmission process for transmitting information between a signal-emitting port for emitting an optical signal and plural signal-receiving ports for receiving the optical signal through a light transmissive medium in an optical circuit device, the process comprising:
   a first step of transmitting a first information by emitting light in a first emission angle range from the signal-emitting port to transmit first information to at least one of the signal-receiving ports; and
   a second step, after the first step, of transmitting second information from the signal-emitting port by emitting light in a second emission angle range different from the first emission angle range to transmit second information to at least one of the signal-receiving ports,
   wherein the data is transmitted in the first step in a lower speed than in the second step.

4. An information transmission process for transmitting information between a signal-emitting port for emitting an optical signal and plural signal-receiving ports for receiving the optical signal through a light transmissive medium in an optical circuit device, the process comprising:
   a first step of transmitting a first information by emitting light in a first emission angle range from the signal-emitting port to transmit first information to at least one of the signal-receiving ports; and
   a second step, after the first step, of transmitting second information from the signal-emitting port by emitting light in a second emission angle range different from the first emission angle range to transmit second information to at least one of the signal-receiving ports,
   wherein the information transmission by light is conducted at least through procedure below:
   (1) a communication-requesting signal is emitted from a port A in the first emission angle range,
   (2) a standby signal is returned to the port A from a port B having received the communication-requesting signal, and
   (3) data is transmitted from the port A to the port B in the second emission angle range smaller than the first emission angle range.

5. The information transmission process according to claim 4, wherein the standby signal is transmitted through an electric wiring.

* * * * *